United States Patent Office 3,494,742
Patented Feb. 10, 1970

3,494,742
APPARATUS FOR FLOAT ZONE MELTING FUSIBLE MATERIAL
Samuel Kuba, Allentown, and Adolph K. Lagarde, Jr., Yardley, Pa., assignors to Western Electric Company, Incorporated, New York, N.Y., a corporation of New York
Continuation of application Ser. No. 517,040, Dec. 28, 1965. This application Dec. 23, 1968, Ser. No. 786,854
Int. Cl. B01j 17/10, 17/36
U.S. Cl. 23—273                 10 Claims

ABSTRACT OF THE DISCLOSURE

A carriage comprising rigidly connected upper and lower plates and having a chuck mounted thereon for gripping one end of a polycrystalline semiconductive rod, is slidably mounted on a support frame for advancing the rod through a work zone. A second carriage having a chuck mounted thereon for gripping the other end of the rod is mounted on the first carriage so that vertical movement of the first carriage imparts a corresponding movement to the second carriage. A screw drive is interconnected between the carriages for both (1) moving the carriages in unison to advance the rod through the work zone and (2) moving the carriages relative to each other for applying longitudinal forces which tend to stretch or compress the rod.

CROSS REFERENCE TO RELATED APPLICATION

This application is a continuation of applicant's copending application Ser. No. 517,040, filed Dec. 28, 1965, now abandoned.

BACKGROUND OF THE INVENTION

Field of the invention

This invention relates to methods and apparatus for treating fusible materials with the float zone melting technique, and more particularly, to methods and apparatus for controlling the distribution of significant minor ingredients in a semiconductive material and/or for forming a single crystal from a polycrystalline rod of semiconductive material. Accordingly, the general objects of the invention are to provide new and improved methods and apparatus of such character.

Technical consideration and description of the prior art

A technique of float zone melting of fusible materials is disclosed in detail in the Theuerer Patent 3,060,123 issued on Oct 23, 1962. That patent and the definitions of such terms as "fusible material," "significant minor ingredient," "zone leveling," and "zone refining" are expressly incorporated herein.

In the treatment of fusible materials utilizing the float zone melting technique, difficulties have been experienced in precisely moving a rod of fusible material past or through a source of heat, usually an induction heating coil. The movement itself must be precise and the speed closely controlled. Also, as the rod heats up to very high temperatures, for example, above 1400° C. for silicon, the supporting structure tends to warp and become misaligned; and there may be galling and erosion of the chucks which hold the rod.

Additionally, there is the problem of maintaining the molten zone, which is formed by the heat source, in its optimum configuration. This includes preventing excessive zone length and the accompanying "pinching" of the zone by the levitation and gravity forces. This requires careful control of: (1) the zone length; (2) the relative rotation of the solid portions; (3) the presence or absence of gases in the area of the molten zone; and (4) the spacing between the molten zone and the induction heating coil.

In order to obtain a uniform distribution of a significant minor ingredient (dopant) in the final rod, it is desirable that there be a dry, chemically pure, nonoxidizing atmosphere around the molten zone at or above atmospheric pressure. This minimizes or eliminates vaporization of the dopant near the surface of the rod when the process is carried out in a vacuum. Vaporization causes a radial distribution of the dopant. It is also desirable that the induction heating coil be spaced very close to the molten zone as this makes possible a shorter, more stable molten zone and growth of larger diameter crystals. However, if the heating coil is immediately surrounding the rod in the inert gas, arcing or ionization may occur if the coil voltages which are used for melting are too high.

The prior art has attempted to minimize the many variables involved by performing only one type of treatment at a time on the fusible rod. Thus, the various possible treatments of zone refining, zone leveling, single crystal formation, or doping have not normally been carried out simultaneously with one another. This has been the general approach taken by industry in the past; for example, as disclosed in Enk et al. Patent 3,141,848.

OTHER OBJECTS

Another object of the invention is to provide new and improved methods and apparatus for forming a single crystal from a polycrystalline rod of fusible material and simultaneously in one pass doping the single crystal so formed with a significant minor ingredient.

Still another object of the invention is to provide new and improved apparatus for precisely advancing a fusible rod past or through a heating source during a float zone melting operation.

It is a further object of the invention to provide new and improved apparatus for float zone melting a rod of fusible material with an induction heating coil spaced very close to the rod in an inert atmosphere.

A still further object of the invention is to provide a new and improved apparatus for minimizing the effects of the heat generated during a float zone melting operation.

SUMMARY

With these and other objects in mind, facilities are provided for heating a vertically positioned polycrystalline rod to form a molten zone in the rod. A single crystal seed is moved into contact with the molten zone and the molten zone is then caused to traverse the rod lengthwise. Simultaneously, a gas, containing a doping material, is impinged on the molten zone and uniformly distributed thereacross so that as the molten zone resolidifies, a uniformly doped single crystal is formed.

An apparatus is provided for very accurately moving a rod, which is to be treated by float zone melting, past a heating member to cause a molten zone to traverse the rod lengthwise. The rod and a single crystal seed are held by upper and lower chucks, respectively, which are connected to respective upper and lower pull shafts. The pull shafts are slidably mounted for movement in a heating chamber by a combination of two fixed bearings for each shaft and a thrust bearing for each shaft, the thrust bearings being movable between their respective fixed bearings. The thrust bearings do not laterally constrain the shafts thus allowing the shafts to bow slightly between the fixed bearings. Also, since there are two fixed bearings for each shaft, the axial positions of the shafts have little effect on the degree of play in the apparatus; and it is possible to move the rod in a very precise vertical, linear path.

In another embodiment of the invention, the rod which is to be treated by float zone melting is supported in an elongated chamber which is purged with an inert gas. A single turn induction-heating coil is positioned inside the chamber and immediately around the molten zone to be formed. A high frequency electrical signal is supplied to the coil having a sufficiently high current to effect melting of the rod and a sufficiently low voltage so that substantially no arcing or ionization occurs in the gas. Additionally, a special chuck may be used which includes facilities for accurately aligning the rod in horizontal and axial directions. The chuck permits the rod to expand, such as in a "freeze off," without damaging the various supporting facilities or shattering the rod itself.

DRAWINGS

Other objects, advantages and aspects of the invention will become apparent by reference to the following detailed description and drawings of a specific embodiment thereof, wherein.

GENERAL ARRANGEMENT AND DETAILED DESCRIPTION

Figure 1:
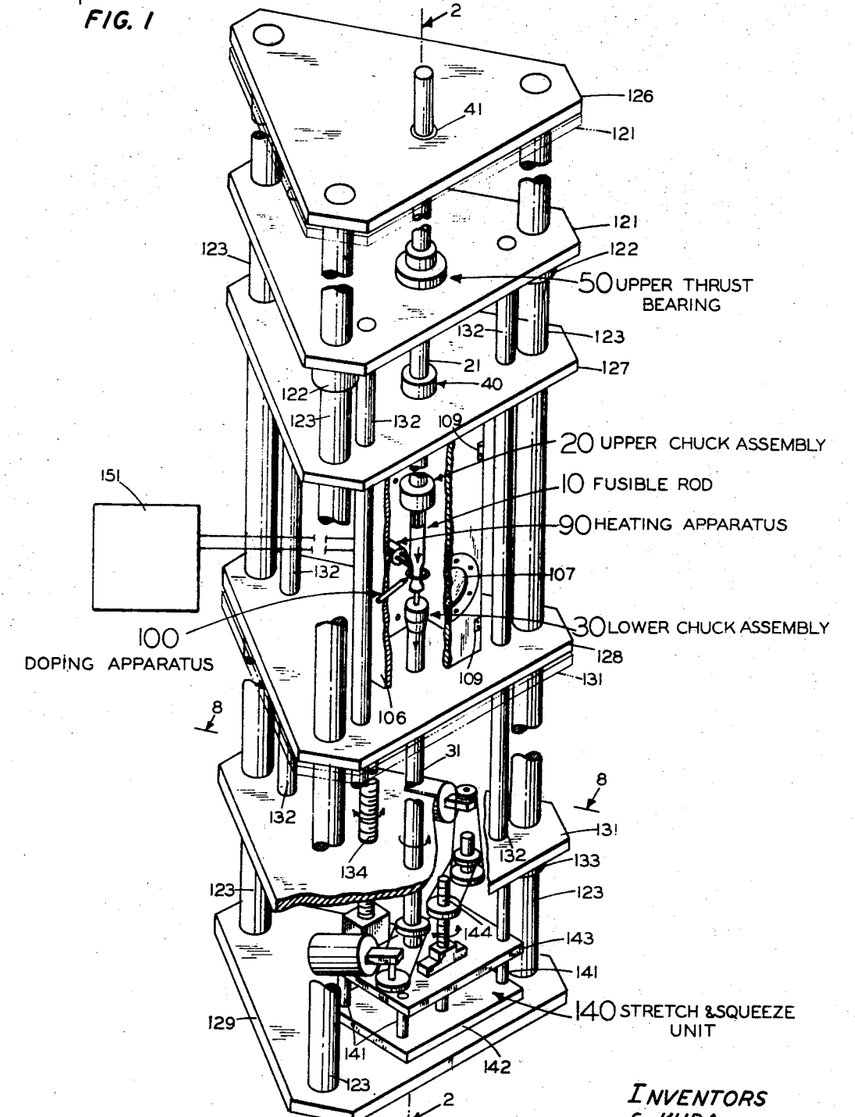
FIG. 1 is a schematic perspective drawing of a preferred form of apparatus embodying the principles of the invention, showing facilities for performing a float zone melting operation on a rod of fusible material.
Figure 2A:
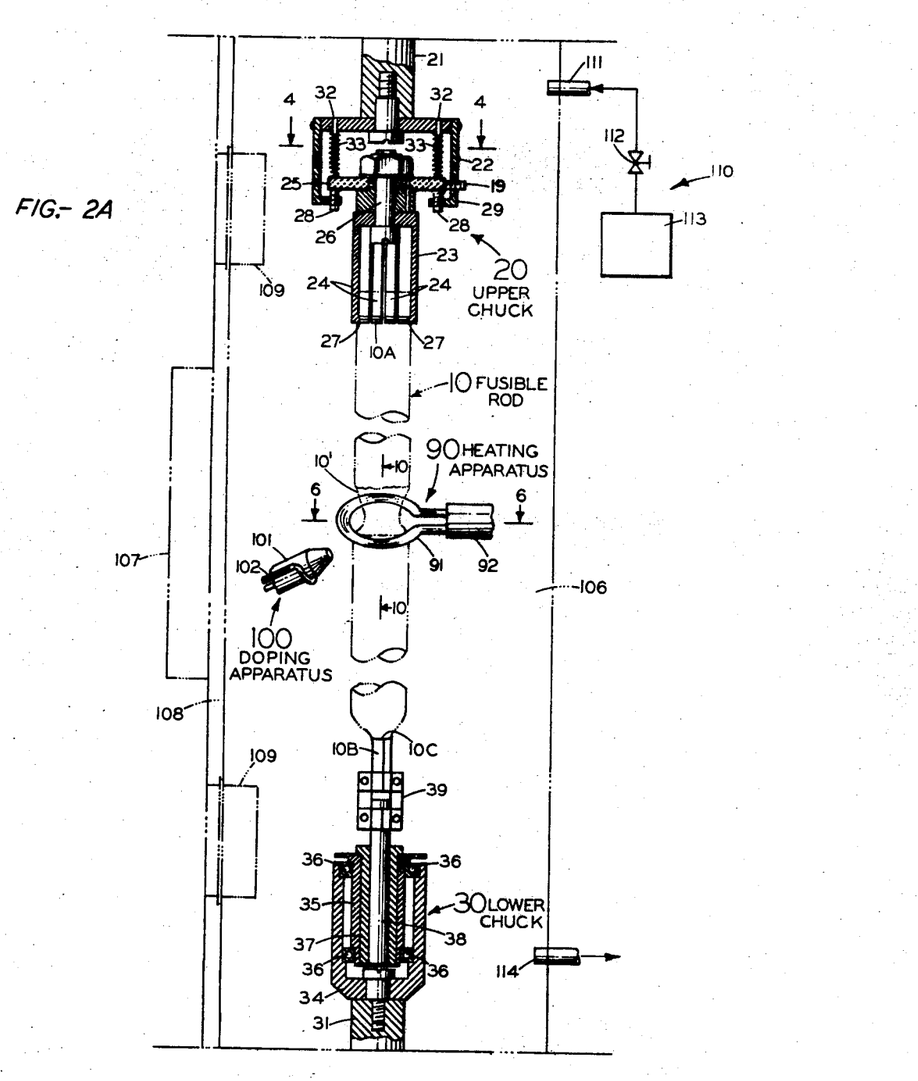
FIG. 2A is a detailed enlarged cross-sectional view of the middle portion of the apparatus, taken on line 2—2 of FIG. 1 and showing the rod which is to be treated and facilities for supporting, heating, and doping the rod.

Referring to FIGS. 1 and 2A, there is shown a cylindrical rod 10 of fusible material, such as silicon, on which it is desired to perform a float zone melting operation. Initially, rod 10 has a polycrystalline structure and possibly some undesirable ingredients which it is desired to concentrate at one end of the rod. Also, it is frequently desirable to grow a single crystal as well as add a doping material to the rod.

Figure 2B:
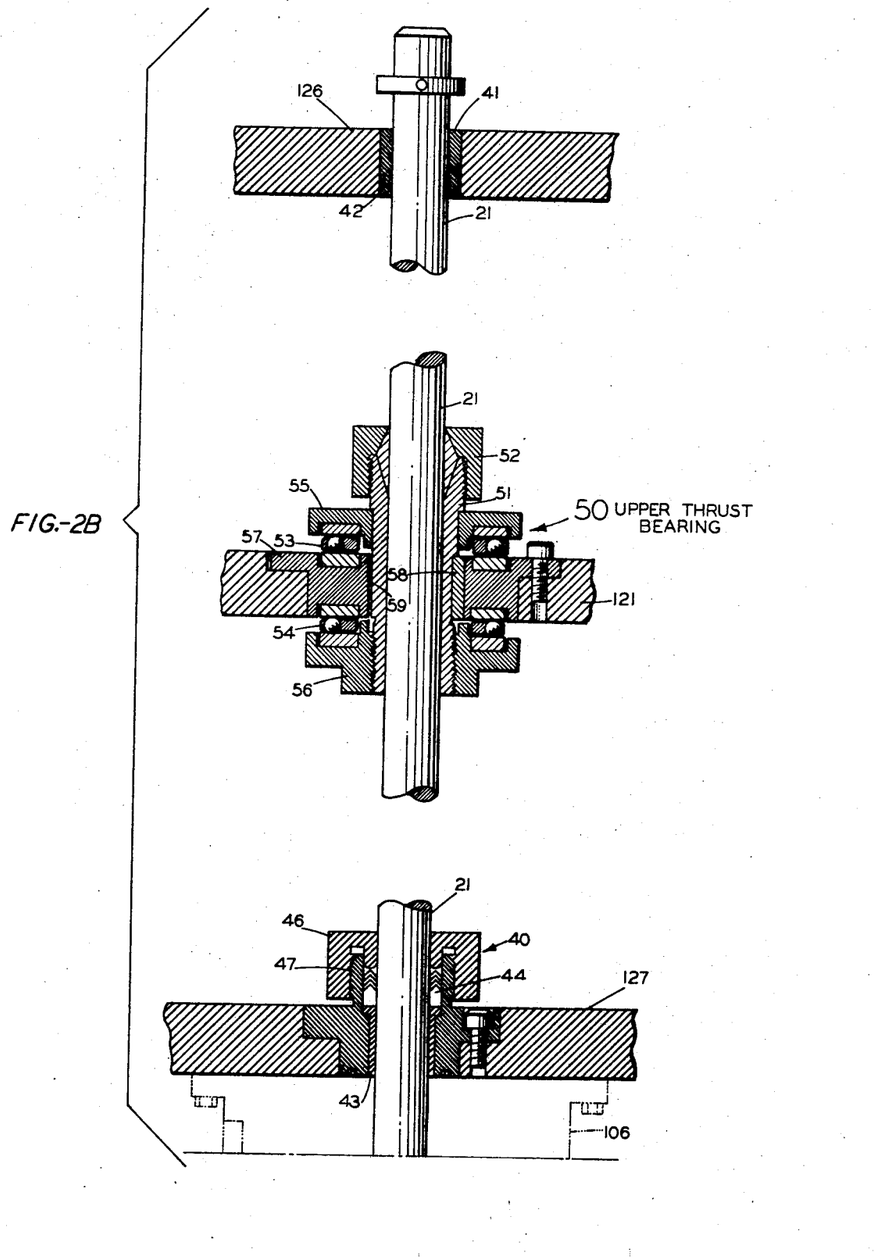
FIG. 2B is a detailed enlarged cross-sectional view of the top portion of the apparatus, taken on line 2—2 of FIG. 1 and showing an arrangement of three bearings for guiding and supporting the upper end of the rod which is being treated.
Figures 2C, 3:
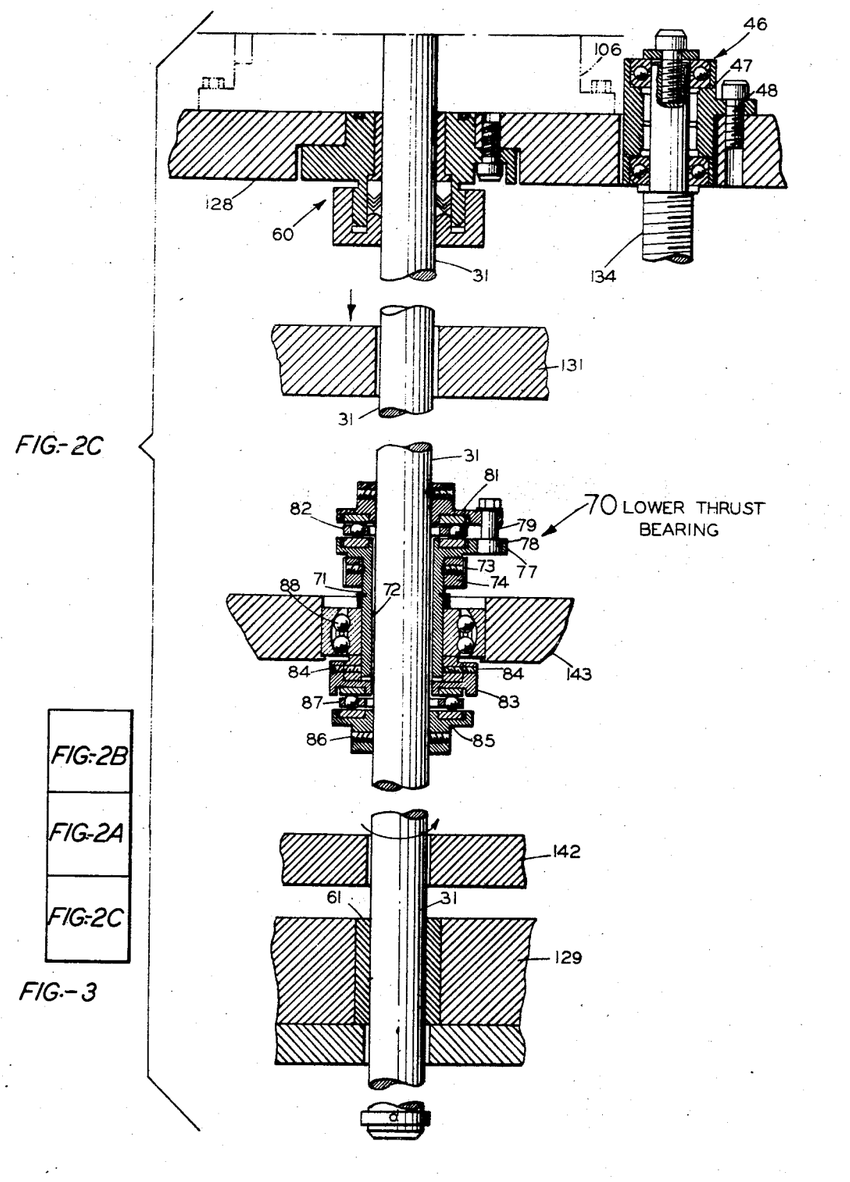
FIG. 2C is a detailed enlarged cross-sectional view of the bottom portion of the apparatus, taken on line 2—2 of FIG. 1 and showing an arrangement of three bearings for guiding and supporting the lower end of the rod which is being treated.
FIG. 3 illustrates the positioning of FIGS. 2A, 2B, and 2C to show the complete apparatus.

The rod 10 is supported at its upper end by a chuck assembly 20 (FIG. 2A) and its lower end by a chuck assembly 30. The upper chuck assembly 20 is connected to an upper pull shaft 21 which is slidably mounted in a first sleeve bearing 40 (FIG. 2B) and a second sleeve bearing 41. Mounted intermediate the sleeve bearings 40 and 41 is a movable thrust bearing 50 for applying vertical movement to the pull shaft 21. In FIG. 2C, there is shown a lower pull shaft 31 which is slidably mounted in a first sleeve bearing 60 and a second sleeve bearing 61. Mounted intermediate the sleeve bearings 60 and 61 is a movable thrust bearing 70. The thrust bearing 70 applies vertical movement to the lower pull shaft 31 and also has facilities (discussed hereinafter) for applying rotation to the lower pull shaft 31.

Immediately surrounding the rod 10 (FIG. 2A) is a heating apparatus 90 including a single turned induction heating coil 91 which is supplied with an electrical signal by a coaxial cable 92. The coil 91 forms a molten zone 10' in the rod 10. Movement of the rod 10 relative to the coil 91 causes the molten zone 10' to traverse the length of the rod 10.

A doping apparatus 100 including a nozzle 101 is positioned beneath the coil 91. A gas containing a doping material is forced through the nozzle 101 and impinges on the molten zone 10'. Water is circulated through a tube 102 for cooling the gas which is forced through the nozzle 101.

The rod 10, the chuck assemblies 20 and 30, the heating coil 91 and the nozzle 101 are all positioned inside a stainless steel double wall, water cooled chamber 106 (FIGS. 1 and 2A) having an observation window 107. A front section 108 of the chamber 106 is hinged at 109—109 to provide access to the inside of the chamber.

Atmosphere control facilities 110 including an inlet tube 111, a valve 112, and a pressurized container 113 are provided for maintaining the chamber 106 filled with a dry, chemically pure, nonoxidizing gas, such as 95% helium and 5% hydrogen, to avoid contamination of the fusible material. The gas is exhausted through an outlet tube 114. The pressure of the gas prevents the dopant from vaporizing and results in a uniform radial distribution of the dopant. The gas also may slightly support the molten zone 10' which otherwise is supported only by the cohesive forces within the molten zone itself and the adhesive forces between the molten zone and the solid materials at the interface of the zone.

Facilities are provided for advancing the upper pull shaft 21 and the lower pull shaft 31 in unison downwardly to move the rod slowly through the induction heating coil 91. This causes the molten zone 10' to traverse the length of the rod 10. The advancing facilities include the upper thrust bearing 50 (FIGS. 1 and 2B) which is secured to an upper triangularly-shaped plate 121. The plate 121 has a trio of ball bushings 122—122 (only two shown) for vertically sliding on a trio of stationary guide rods 123—123. The guide rods 123—123 are supported between four stationary triangularly-shaped plates 126, 127, 128 and 129 to form a rigid support frame. The plate 121 is connected to a lower movable plate 131 by a trio of rods 132—132 so that the two plates, in conjunction with the rods 132—132, form a movable carriage wherein the upper and lower plates 121 and 131 thereof, move in unison. The lower plate 131 is also provided with a trio of ball bushings 133—133 (only one shown) which are slidable on the guide rods 123—123. The lower plate 131 is movable up and down on the guide rods 123—123 by a feed screw 134 which is driven by a motor 136.

Depending from the lower plate 131 is a second carriage or stretch and squeeze unit 140 (FIGS. 1, 8 and 9) for applying relative movement between the upper pull shaft 21 and the lower pull shaft 31. The stretch and squeeze unit 140 is supported on four depending guide rods 141—141 which are connected at their lower end to a plate 142. The thrust bearing 70 (FIGS. 2C and 8) is mounted on an intermediate movable plate 143 which is slidable up and down on the guide rods 141—141. The vertical position of the plate 143 can be varied by rotating a second feed screw 144 in order to raise or lower pull shaft 31 with respect to the upper pull shaft 21.

Thus, as the lower plate 131 is lowered by the feed screw 134 (FIG. 8), the entire stretch and squeeze unit 140 is lowered. This causes the thrust bearing 70 and the lower pull shaft 31 to move downwardly; and since the lower plate 131 is rigidly connected to the upper plate 121, the upper thrust bearing 50 simultaneously lowers the upper pull shaft 21 in unison with the lower pull shaft 31. If an operator detects that a "freeze off" is occurring (and during the start-up of an operation), the feed screw 144 is rotated to lower or raise the lower pull shaft 31 with respect to the upper pull shaft 21.

Figure 8:
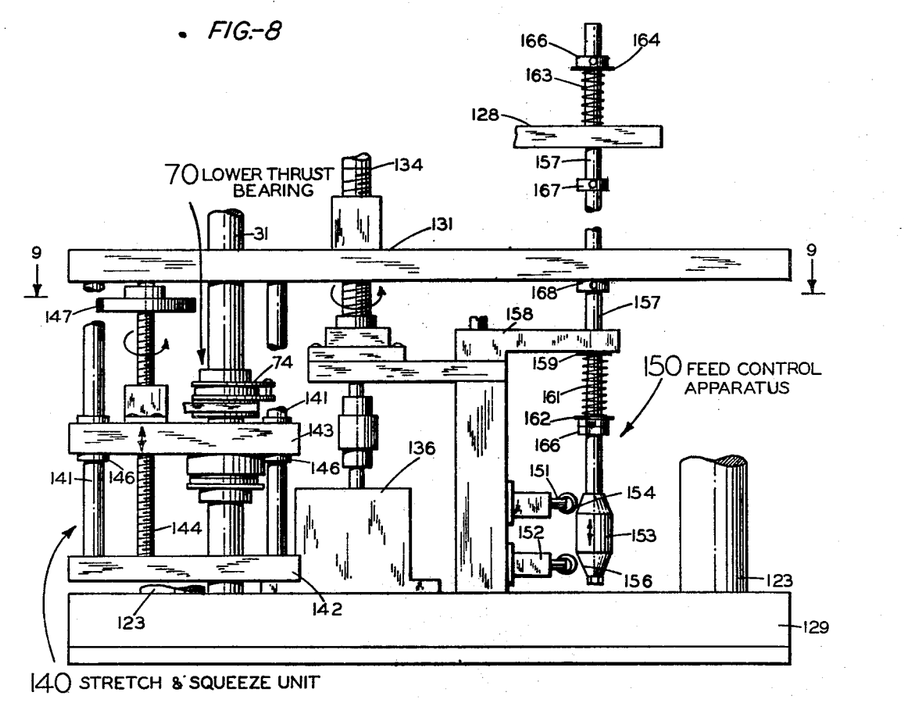
FIG. 8 is a detailed side elevation view with portions removed, taken along line 8—8 of FIG. 1 and showing a stretch and squeeze apparatus and a feed control apparatus.
Figure 10A:
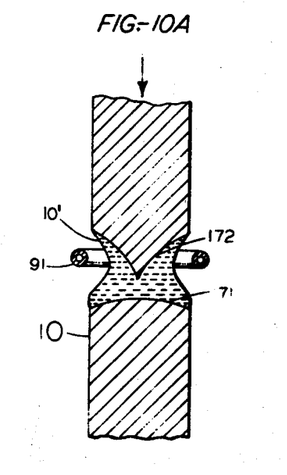
FIG. 10A is a cross-sectional view taken along line 10—10 of FIG. 2A and showing a typical configuration of the molten zone and the liquid-solid interfaces.
Figure 10B:
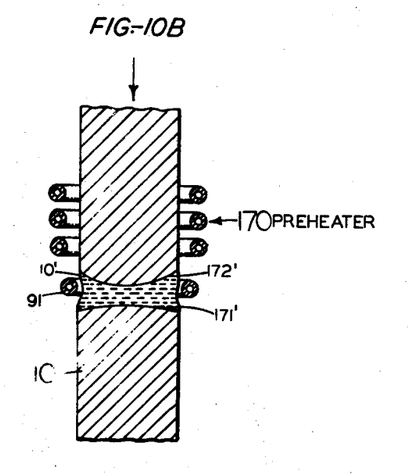
FIG. 10B is the same view as FIG. 10A with a multiple turn induction preheating coil added.

The upper and lower limits of travel of the lower plate 131 are controlled by a feed control apparatus 150 (FIG. 8). A preheater 170 may be used to control the shape of the molten zone 10' and the liquid-solid interfaces (FIGS. 10A and 10B).

Upper chuck assembly 20

Figure 4:
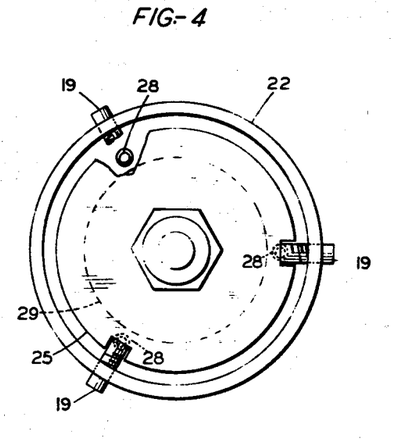
FIG. 4 is a plan view of an upper chuck assembly taken along line 4—4 of FIG. 2A with portions removed.
Figure 5:
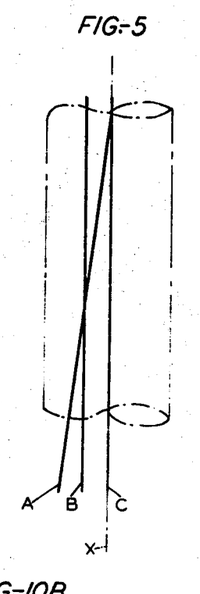
FIG. 5 illustrates various axial positions of the rod which is being treated.

Referring to FIGS. 2A, 4 and 5, there is shown the upper chuck 20 with which the rod 10 is horizontally and vertically aligned. The chuck 20 is designed to accommodate for the radial and axial expansion of itself and of the rod 10 which occurs during the process. The chuck 20 includes a metal housing 22 which is bolted to the bottom of the upper pull shaft 21. A cylindrical sleeve 23 having a plurality of resilient fingers 24—24 (preferably of tantalum-tungsten alloy) for gripping the rod 10 is supported from a wobble plate 25. The wobble plate 25 is preferably made of an insulating material, such as quartz, to prevent conduction to the pull shaft 21 of the heat which is generated when the coil 91 is close to the chuck 20. The sleeve 23 is releasably connected to the wobble plate 25 by a bolt 26 so that various sleeves may be used to accommodate various diameter rods. Protrusions 27—27 at the ends of the fingers 24—24 may be flexed outwardly and then released to grip the rod 10 in a groove 10A.

In FIG. 5, there is shown a vertical axis X which passes through the center of the induction heating coil 91. It is desired that the longitudinal axis of the rod 10 coincide at all times during a cycle of float zone melting with the axis X. Initially, it is assumed that the rod 10 is askew as shown in position A. Facilities are provided for tilting the rod until it assumes position B and then laterally moving the rod 10 to position C which coincides with the vertical axis X. These facilities include three leveling screws 28–28 (FIGS. 2A and 4), spaced 120° apart, which are threaded vertically through an inwardly directed flange 29 of the housing 22. By adjusting the screws 28–28 against the bottom of the wobble plate 25, the rod 10 is made to assume the position B. Three lateral displacing screws 19—19 spaced 120° apart are provided above the leveling screws 28—28. The screws 19—19 are threaded through the side of the housing 22 to engage and move the wobble plate 25 in a lateral direction in order to bring the rod 10 into position C.

Also provided are three pins 32—32 (FIG. 2A, only two shown) which depend from the upper part of the housing 22. The pins 32—32 are surrounded by compression springs 33—33 which engage the upper surface of the wobble plate 25. The springs 33—33 normally urge the rod 10 downwardly but allow for upper movement of the wobble plate 25 in order to compensate for expansion of the rod 10 if a freeze off occurs. Thus, as the rod 10 is heated up during a float zone melting operation, the resilient fingers 24—24 allow for radial expansion of the rod and dimensional changes in the chuck itself; and the springs 33—33 permit axial expansion when a freeze off occurs.

Lower chuck assembly 30

Referring to FIG. 2A, there is shown the lower chuck assembly 30 for supporting a single crystal seed 10B and for applying rotation to the lower end of the rod 10. The chuck assembly 30 includes a housing 34 having a sleeve 35 which is free to rotate with respect to the housing 34 on ball bearings 36—36. Mounted in an inner sleeve 37 is an elongated quartz rod 38. A seed chuck 39, which holds the single crystal seed 10B, is secured to the other end of the quartz rod 38. The seed 10B has a single crystal structure which it is desired that the rod 10 have at the end of the float zone melting operation. The housing 34 is fixedly secured to the lower pull shaft 31, but the only radial connection between the housing 34 and the sleeve 35 is the small but sufficient friction which exists in the ball bearings 36—36. During normal operation, the rotation of the pull shaft 31 is communicated to the crystal seed 10B by the friction in the ball bearings 36—36 and the friction between the sleeve 35 and the inner sleeve 37. If during the float zone melting operation, the molten zone 10' freezes out, the rotation of the pull shaft 31 is not communicated to the seed 10B and the lower part of the rod 10. Thus, the lower chuck assembly 30 acts as a slip clutch so that only a predetermined maximum amount of torque is applied to the rod 10 as determined by the amount of friction which exists in the ball bearings 36—36.

Bearing arrangement 40, 41, 50, 60, 61, and 70

It is desirable that the upper pull shaft 21 and the lower pull shaft 31 be moved in a precisely controlled vertically downward path to advance the rod 10 through the induction heating coil 91. Pull shafts have had a tendency to bow somewhat in the past due to the intense heat which is generated, the natural tendencies of long metal shafts to become distorted, and most importantly due to mechanical play and misalignment being exaggerated when the distance between bearing centers becomes small. In order to accommodate this bowing and in order to provide wobble-free movement of the chuck ends of the pull shafts, a special arrangement of bearings has been provided. For the upper pull shaft 21 (FIG. 2B), this includes the two fixed sleeve bearings 40 and 41 and the intermediate thrust bearing 50. For the lower pull shaft 31 (FIG. 2C), this includes the two fixed sleeve bearings 60 and 61 and the intermediate thrust bearing 70.

The sleeve bearing 40 is mounted on the plate 127 and includes a bushing 43 and an air tight packing gland 44. The packing gland 44 is held in place by an interiorly threaded collar 46 which threads onto an upstanding sleeve 47 secured to the plate 127. The packing gland 44 seals the gas in the chamber 106; and the bushing 43 laterally constrains the pull shaft 21 while allowing the shaft to slide freely in a vertical direction. The sleeve bearing 41 is mounted on the plate 126 and includes a bushing 42 which laterally constrains the pull shaft 21 and in which the pull shaft is free to slide.

The upper thrust bearing 50 (FIG. 2B) includes a first bearing unit having a bearing support 57 which is bolted to the upper movable plate 121 and which is spaced from the upper pull shaft 21, and a second bearing unit including a collect chuck 51 having a knurled head 52 which is threaded thereon and upper and lower bearing housings 55 and 56. The second bearing unit is connected to the shaft 21 and engages the first bearing unit for communicating vertical movement from the first bearing unit to the shaft. The position of the upper pull shaft 21 can be properly adjusted with respect to the lower pull shaft 31, depending on the length of the rod 10, and then locked into place with the knurled head 52. A pair of flat race roller bearings 53 and 54 are secured in place by upper and lower bearing housings 55 and 56, respectively. The housings 55 and 56 engage the outer races to hold the inner races of the bearings against a bearing support 57 which is bolted to the upper movable plate 121. The upper bearing housing 55 is press fitted onto the collet chuck 51; and the lower bearing housing 56 is threaded thereon to allow the bearings 53 and 54 to be assembled in position and then locked in place. The collet chuck 51 is connected to the bearing support 57 by a key 58 which prevents any rotation of the upper pull shaft 21. A clearance 59 is provided between the collet chuck 51 and the bearing support 57 so that the pull shaft 21 is free to bow outwardly on the flat race bearings 53 and 54 to the extent of the clearance 59 without lateral constraint.

The fixed sleeve bearing 60 (FIG. 2C) is mounted on the plate 128 and is similar to the fixed sleeve bearing 40 (FIG. 2B) except that it is inverted. The fixed sleeve bearing 61 (FIG. 2C) is mounted on the plate 129 and is similar to the fixed sleeve bearing 41 (FIG. 2B). The bearings 60 and 61 laterally constrain the pull shaft 31, and allow the pull shaft 31 to slide freely therethrough.

The thrust bearing 70 (FIG. 2C) applies axial as well as rotative movement to the lower pull shaft 31. The rotation is desirable in that it effects a greater stirring action in the molten zone 10′ to more evenly distribute the doping material which is impinged thereon. The thrust bearing 70 includes a first bearing unit comprising sleeve 71, flanges 77 and 81 and flat raced bearing 82, and a second bearing unit comprising bearing supports 83 and 85 and flat raced bearing 87. The sleeve 71 of the first bearing unit is mounted to provide a clearance 72 between it and the pull shaft 31. The clearance 72 would normally be the same in magnitude and have the same function as the clearance 59 of the upper thrust bearing 50, described hereinabove. The sleeve 71 is rotated by a pulley belt 73 mounted on a sheave 74 which is secured to the sleeve 71. The pulley belt 73 is driven by a motor 76 (FIG. 9) mounted on the movable plate 143. The sleeve 71 includes an outwardly extending flange 77 at its upper end having an aperture 78 which receives a pin 79. The pin 79 communicates the rotation of the sleeve 71 to an upper flange 81 which is clamped to the lower pull shaft 31. The flanges 77 and 81 support a flat raced bearing 82 therebetween.

A bearing support 83 is connected to the lower end of the sleeve 71 by set screws 84—84. A lower bearing support 85, which is held by a set screw 86 on the pull shaft 31, acts with the bearing support 83 to hold a flat raced bearing 87 in place therebetween. A radial race self-aligning bearing 88 is secured between the sleeve 71 and the movable plate 143 to permit the lower pull shaft 31 to rotate on its longitudinal axis. Thus, the arrangement of bearings 60, 61 and 70 is similar to the upper arrangement of bearings 40, 41, and 50 in that they allow the lower pull shaft 31 to bow outwardly to the extent of the clearance 72. The thrust bearing 70 additionally provides rotative motion to the lower pull shaft 31 to stir the molten zone 10′. In FIG. 2C, the upper end of the feed screw 134, which raises and lowers the lower plate 131, is supported in a thrust bearing 46. The thrust bearing 46 is mounted in a housing 47 which is bolted at 48 to the plate 128.

Heating apparatus 90

Figure 6:
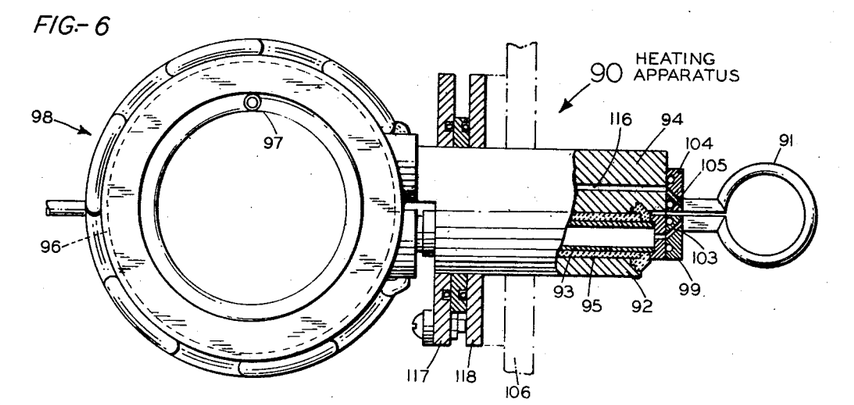
FIG. 6 is a horizontal sectional view of an apparatus for heating the rod to form a molten zone therein, taken generally along line 6—6 of FIG. 2A.
Figure 7:
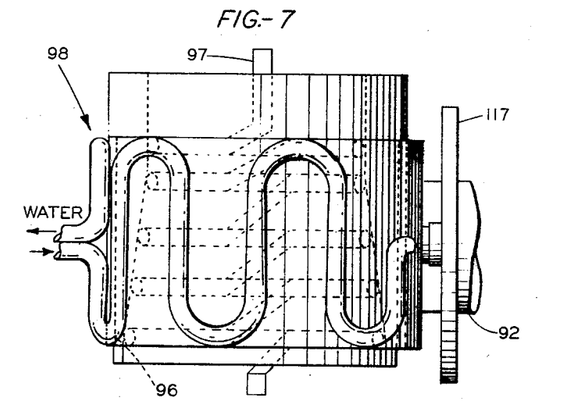
FIG. 7 is an elevation view of the heating apparatus of FIG. 6 with portions removed.

The heating apparatus 90 (FIGS. 6 and 7) includes the single turn induction heating coil 91 which immediately surrounds the molten zone 10′. For example, when heating a 1¼″ rod, the inside diameter of the heating coil should be approximately 1 7/16″. In general, the inside diameter of the heating coil should be no more than ¼″ greater than the diameter of the rod. The heating coil 91 is supplied with a high frequency, high current electrical signal from the low inductance coaxial cable 92 in order to create a sufficiently large alternating magnetic field to form the molten zone 10′. The coaxial cable 92 includes a hollow inner conductor 93 which is insulated from an outer conductor 94 by a ceramic sleeve 95. An input signal is supplied between the inner and outer conductors 93 and 94 by a hollow, single turn secondary coil 96 surrounding a primary coil 97 of a transformer 98. The electrical center of the secondary coil 96 is grounded to eliminate high voltage at the heating coil 91 due to electrostatic pickup from the primary coil 97. The inner conductor 93 is brazed to a flange 99 having an aperture 103 extending therethrough. Cooling water is passed through the secondary coil 96, the inner conductor 93 and the aperture 103 in the flange 99 and flows through the induction heating coil 91. The electrical circuit is completed to the outer conductor 94 through another flange 104 having an aperture 105. The cooling water is free to pass through the aperture 105 and a passageway 116 which extends through the length of the outer conductor 94 and back out through the secondary coil 96. The coaxial cable 92 has a flange 117 which is gas sealed to and electrically insulated from a flange 118. The flange 118 is brazed to the outer surface of the chamber 106.

It is desirable to use the coaxial cable because of the high current at high frequencies which the cable is capable of carrying with low loss due to its low inductance. High current in turn is necessary so that sufficient power can be supplied with low voltages without any accompanying arcing or ionization of the inert gas. Thus, the advantages which accrue from the use of an inert atmosphere, instead of a vacuum, may be combined with the advantages of placing an induction heating coil immediately surrounding the molten zone 10′ without the problem of arcing or ionization of the gas.

Figure 13:
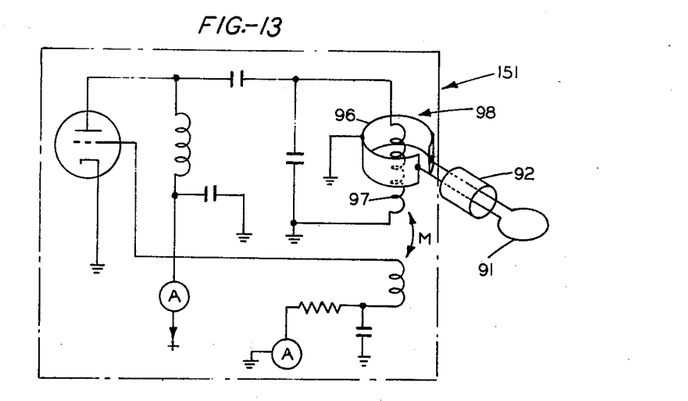
FIG. 13 is a schematic diagram illustrating a power supply for the apparatus.

In FIG. 13, there is shown a power supply for the transformer 98 which comprises a tuned plate oscillator designated generally by the numeral 151. A "tank" circuit includes the primary coil 97 of the coaxial transformer 98. The number of turns in the primary coil 97 should be adjusted in order to obtain maximum power from the generator, i.e., maximum plate current occurring at maximum plate voltage.

By using a single turn induction heating coil, it is possible to minimize the voltage across the coil while still having maximum power in the field that the coil produces. Therefore, the coil 91 can be positioned very close to the rod 10 and immersed in the inert gas without arcing or ionization. This permits the length of molten zone 10′ to be minimized due to the close coupling. By minimizing the length of the molten zone 10′, it is possible to treat large diameter of rods without spilling the molten zone, as will be apparent to one skilled in the art. Thus, large diameter rods having uniform doping and crystal structures can be formed by utilizing the above principles. The rod can be subsequently cut into a plurality of slices and then diced into discrete uniform wafers all of which is much more economical when large diameter rods are used as the starting product.

Doping apparatus 100

Usually, the rod 10 is a semiconductor material, such as silicon. As is known in the art, the elements boron, aluminum, gallium, and indium, which are in Group III of the Periodic Table, are suitable acceptor type (p-type) doping impurities for silicon and germanium. The elements phosphorus, arsenic and antimony, which are in Group V of the Periodic Table, are suitable donor type (n-type) impurities for silicon and germanium. The gas which is passed through the nozzle 101 is preferably a hydride of the selected doping element. Examples are phosphorous hydride (phosphine), boron hydride (diborane) and arsenic hydride (arsine). The gaseous hydride material is diluted with a carrier gas such as hydrogen or helium so that it can be handled safely and measured accurately. Also, volatile compounds of the above-named impurity elements other than hydrides may be used provided that they can be diluted with a carrier gas such as hydrogen to give a stable mixture which can be injected into the molten zone 10' in controlled amounts. Examples of such volatile compounds are $BCl_3$, $BBr_3$, $AsCl_3$, and $SbCl_5$.

Stretch and squeeze unit 140

Figure 9:
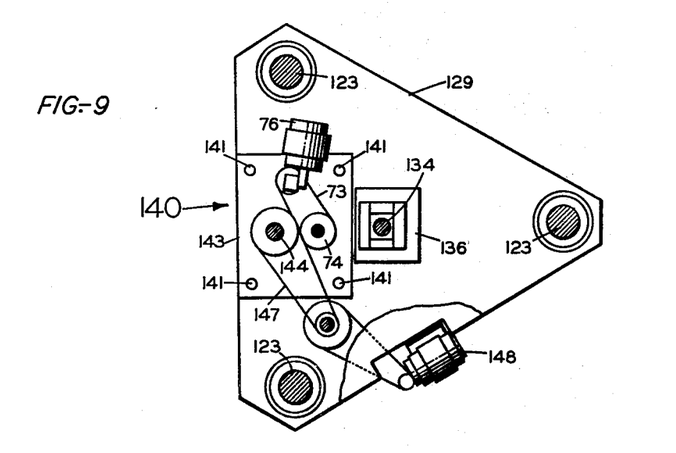
FIG. 9 is a cross-sectional view taken along line 9—9 of FIG. 8 and showing an arrangement of pulleys and motors for driving various facilities.

Referring to FIGS. 8 and 9, a second movable carriage or stretch and squeeze unit 140 is effective to apply relative axial movement to the lower pull shaft 31 with respect to the upper pull shaft 21. Thus, if an operator detects that the molten zone 10' is assuming a sagging configuration, the lower pull shaft 31 is moved upwardly with respect to the upper pull shaft 21. Likewise, if the operator detects that the molten zone 10' is assuming a bulging configuration, the lower pull shaft 31 is moved downwardly with respect to the upper pull shaft 21. The four depending guide rods 141—141 are rigidly connected between the lower plate 131 of the first movable carriage and the plate 142 of the second movable carriage or stretch and squeeze unit to form the unit's support frame. The intermediate movable plate 143 has four sleeve bearings 146—146 (FIG. 8) which allow it to slide up and down on the guide rods 141—141. The feed screw 144 is driven through a pulley arrangement 147 (FIG. 9) by a motor 148. The feed screw 144 is threaded through the movable plate 143 so that as the feed screw 144 is rotated the movable plate 143 and the thrust bearing 70, which is mounted thereon, are moved up and down. Thus, if the operator detects an undesirable configuration of the molten zone 10', the thrust bearing 70 and the lower pull shaft 31 are moved up or down by energization of the motor 148 so as to either shorten or lengthen the molten zone 10'.

Feed control apparatus 150

The feed control apparatus 150 (FIG. 8) is provided to control the upper and lower limits of travel of the pull shafts 21 and 31. A first limit switch 151 is opened to de-energize the motor 136 and stop the rotation of the feed screw 134 when the lower plate 131 reaches its upper limit of travel; a second limit switch 152 is opened to de-energize the motor 136 when the lower plate 131 reaches its lower limit of travel.

More particularly, a cam 153 having camming surfaces 154 and 156 is pinned to a vertical shaft 157. The shaft 157 slides freely through the lower plate 131 and is supported in a bracket 158 having a sleeve bearing 159. A first compression spring 161 is held between the bracket 158 and a washer 162. A second compression spring 163 is held between a washer 164 and the stationary plate 128. The positions of the washers 162 and 164 are adjustable by bolts 166—166. The springs 161 and 163 co-operate to maintain the camming surfaces 154 and 156 normally out of their actuating positions with respect to the limit switches 151 and 152, respectively. An upper stop 167 and a lower stop 168 are fastened to the shaft 157 and are adjustable to suit the length of the rod being processed. The lower plate 131 strikes the stops 167 and 168 to move the shaft 157 axially when the plate 131 reaches its upper and lower limits, respectively. Axial movement of the shaft 157 advances the cam 153 to open either the limit switch 151 or 152 to de-energize the motor 136, and thus control the upper and lower limits of travel of the lower plate 131.

Preheater 170

Referring to FIGS. 10A and 10B, there is shown a comparison of the liquid-solid interfaces of the molten zone without a preheater (FIG. 10A) and with a preheater 170 (FIG. 10B). Ideally, the growing interface 171 should be perfectly flat. Thus, assuming Miller (111) or (100) crystallographic planes are being grown, theoretically one plane at a time is grown as the molten zone 10' resolidifies at interface 171. When the interface 171 is humped, many planes are simultaneously being grown. Under these conditions, crystal imperfections are more likely to result and even a polycrystalline structure is possible. In practice, it is impossible to achieve perfect flatness, but great improvements in the shape of the interface have been made by adding the preheater 170 and by increasing the speed at which the rod 10 is advanced through the coil 91.

The molten zone is being formed at the upper liquid-solid interface by the coil 91. Naturally, the temperature at the surface of the rod, being closer to the coil 91, is hotter than the temperature on the inside of the rod 10. Also, the temperature at the center of the rod in the horizontal plane of the coil is hotter than the center of the rod further up. Thus, the liquid-solid interface is that of a spike, shown as 172 in FIG. 10A. The same considerations also apply to the growing interface 171. However, since heat of fusion is released off as the liquid resolidifies, the temperatures at the lower interface are less affected by the coil 91 and are more evenly distributed across the horizontal cross section. The heat released as a result of solidification causes a "hot" layer above the growing interface 171 and thus fattens the interface.

In order to modify the shape of the spike 172, the preheater 170 was added. The preheater 170 is a multiple turn induction heating coil which is connected in parallel with the coil 91. It can be used to raise the temperature of the rod 10 above the molten zone 10' to a few degrees under the melting temperature of the rod. This has the effect of rounding off the tip of the spike as shown at 172', which reduces the "heat sinking effect" of the spike on the growing interface 171 and naturally flattens the growing interface as shown at 171' (FIG. 10B).

In addition to the preheater, it has been found advantageous to advance the rod at a faster rate through the coil 91 than was previously believed desirable. This increases the effect of the heat of solidification (which is even across a cross section and tends to flatten the interface 171) and decreases the relative effect of the heat from the coil 91 (which is uneven across a cross section and tends to cause a hump). In practice, the maximum speed is limited by other factors such as the amount of time required to evenly distribute the doping gas. However, by utilizing the preheater 170 and by increasing the speed of advance of the rod 10, substantially better crystal structure has been found to result.

Operation

In normal practice, it is desired to perform a float zone melting operation on a rod of fusible material which may be as long as 24" and have a diameter of over ¼". The operation which will be described is that of growing a single crystal rod from a polycrystalline rod and simultaneously impinging a gas containing a doping material on the molten zone 10'. Initially, the seed chuck 39 is loaded with a single crystal seed 10B. A polycrystalline rod 10 is loaded into the upper chuck assembly 20 by expanding the resilient fingers 24—24 outwardly so that the protrusions 27—27 can grip the rod 10 in the groove 10A. The leveling screws 28—28 and the lateral displacing screws 19—19 are then adjusted so that the rod 10 is vertically and horizontally aligned and concentric with the induction heating coil 91.

The knurled head 52 (FIG. 2B) is rotated to release the collet chuck 51 so that the upper pull shaft 21 may be moved downwardly until the rod 10 is in a position spaced slightly above the single crystal seed 10B. The upper pull shaft 21 and the lower pull shaft 31 are then moved downwardly in unison by the feed screw 134 and the motor 136 until the induction heating coil 91 is immediately adjacent the resilient fingers 24 (FIG. 2A)

of the upper chuck 20. The fingers 24 act as a susceptor in order to heat the rod 10 until it becomes conductive. The pull shafts 21 and 31 are then driven upwardly causing the heated (not molten) zone to traverse the length of the rod 10 driving out any moisture and other volatile impurities from the rod. At the bottom of the rod 10, a tear drop of molten material is formed. The lower thrust bearing 70 is then moved upwardly by the feed screw 144 and the motor 148 in order to raise the lower pull shaft 31 until the single crystal seed 10B contacts the molten tear drop. At this time the plates 121 and 131 are in their raised positions as shown in phantom lines in FIG. 1.

With the uniting of the single crystal seed 10B and the rod so formed, the stretch and squeeze unit 140 is used to shape the shoulder 10C (FIG. 2A). The feed screw 134 is rotated by the motor 136 in order to slowly move the rod 10 downwardly through the induction heating coil 91. This causes the molten zone 10' to slowly traverse the rod 10 and, as the molten zone 10' resolidifies, it assumes the single crystal formation of the seed 10B. Simultaneously, a gas containing a doping material is forced through the nozzle 101 and impinged on a molten zone 10'. The molten zone 10' is stirred by rotating the seed 10B and slightly by the magnetic field at the coil 91. Rotation of the seed 10B is effected by rotating the thrust bearing 70 (FIGS. 8 and 9) through the pulley arrangement 73 and the motor 76. If, at any time, the molten zone 10' freezes out, the lower chuck assembly 30 acts as a slip clutch and does not transmit the torque to the lower end of the rod 10. Also, the chamber 106 is continuously supplied with an inert gas which prevents contamination of the molten zone 10' and which makes possible an even distribution of the doping material throughout the rod. Arcing and ionization in the inert atmosphere are prevented by supplying a high frequency electrical signal to the induction heating coil 91 which has a high current and a low voltage.

As the pull shafts 21 and 31 move downwardly, the thrust bearings 50 and 70, the sleeve bearings 40, 41, 60 and 61 maintain the pull shafts 21 and 31 in their vertical orientation. If the pull shafts 21 and 31 are bowed due to normal tolerances, this is allowed for by the clearances 59 and 72 which exist in the thrust bearings 50 and 70, respectively. Similarly, if the rod 10 expands due to a freeze off, this expansion is taken up by the springs 33—33 of the upper chuck assembly 20 without causing misalignment of the rod 10 with respect to the induction heating coil 91. Additionally, the housing 22 and the wobble plate 25 of the upper chuck assembly 20 prevent the conduction of heat to the pull shaft 21 so as to minimize the deleterious effects of the heat on the pull shaft 21 and the upper chuck assembly itself.

At the conclusion of the float zone melting operation, when the molten zone 10' has traversed the entire length of the rod 10, the resulting rod has a single crystal structure with a doping material substantially evenly distributed throughout its cross section and along its length. It is particularly desirable that the single crystal rod be doped to the desired resistivity as it is grown since this eliminates the need for additional passes which might spill the molten zone and which might change the even resistivity pattern to an uneven pattern. When the float zone melting operation is completed and the rod 10 is cool, the resilient fingers 24—24 are flexed outwardly to release the upper end of the rod 10 and the rod and single crystal seed 10B may then be withdrawn from the seed chuck 39.

Example

Figure 11:
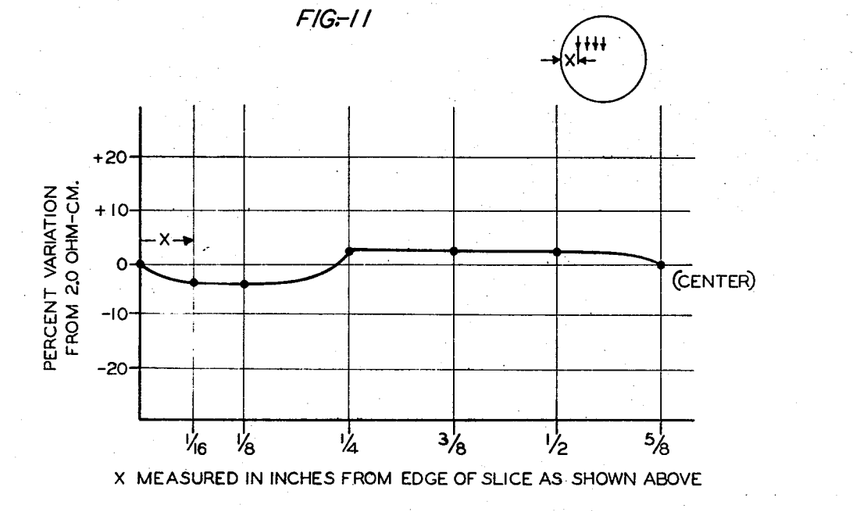
FIG. 11 is a typical graph showing the resistivity of a doped single crystal rod as it varies along a cross section.
Figure 12:
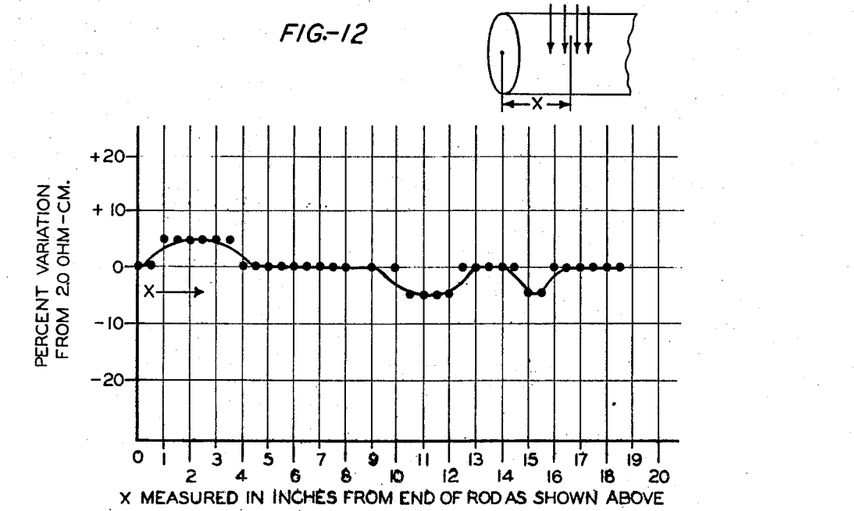
FIG. 12 is a typical graph showing the resistivity of a doped single crystal rod as it varies along the length of the rod.

A rod of polycrystalline silicon material 21″ long and 1¼″ in diameter was inserted into the upper chuck 20 and the lower chuck 30. The initial resistivity of the rod was greater than 300 ohm-cm. The chamber 106 was filled with an inert gas of 95% helium and 5% hydrogen at substantially atmospheric pressure. A molten zone was formed in the rod by heating the rod to a temperature in excess of 1400° C. and a single crystal seed of silicon was advanced into contact with the liquid bottom of the rod 10. The rod was advanced downwardly through a single turn induction heating coil at a rate of 7½″ per hour; and the lower pull shaft and chuck were rotated at 12 r.p.m. A doping gas containing 25.0 parts per million of phosphine in helium was impinged on the molten zone. The distribution of the doping impurities resulted in a resistivity along a cross section as is shown in FIG. 11 and the resistivity taken lengthwise on the rod was as is shown in FIG. 12. It should be noted that the resistivity of the finished rod varied no more than 5% over the radius or the length. The readings were taken using a conventional four point probe. The radial readings (FIG. 12) were calculated using Swartzendruber, National Bureau of Standards, Technical Note 199, Table I (Apr. 15, 1964). Rods having resistances ranging from 0.01 ohm-cm. to 40 ohm-cm. have been produced with this technique, although these are not limitations on the range which can be achieved.

It is to be understood that the above-described method and arrangements of apparatus and construction of elemental parts are simply illustrative of an application of the principles of the invention and many other modifications may be made without departing from the invention. For example, instead of forming a single crystal rod, the apparatus is useful in performing other float zone melting operations, such as zone refining and zone leveling. Also, the invention is not limited to the handling of semiconductor materials but is useful on any type of fusible material which is not damaged by heat. Further, while the invention has been described in combination with a chamber containing an inert atmosphere, many of the principles of the invention are applicable for use in a vacuum chamber.

What is claimed is:

1. An apparatus for vertically moving a rod through a treatment chamber, wherein said rod is supported at opposite ends by an upper holder and a lower holder, and there is provided facilities for moving the holders to advance the rod, the improvement which comprises:
   a thrust bearing supporting said lower holder for lateral movement relative to said upper holder;
   means for imparting rotative forces to said thrust bearing to urge said lower holder to rotate relative to said upper holder;
   means mounting said thrust bearing for vertical movement; and
   means for vertically moving said thrust bearing to vertically move said lower holder relative to said upper holder.

2. An apparatus for advancing a workpiece through a treating chamber characterized by a framework for supporting the treating chamber, a first holder extending into one side of the chamber for gripping one end of the workpiece and mounted for vertical and lateral movement in the chamber, a second holder extending through the opposite side of the chamber for gripping the other end of the workpiece and mounted for vertical, and lateral movement in the chamber with facilities for moving the second holder in the chamber to grip the workpiece and to thereafter move both the holders to advance the workpiece through the chamber while rotating the second holder, the improvement to which includes:
   a first sleeve bearing mounted in said framework in communication with said treating chamber to permit sliding of said second holder means therethrough and to preclude lateral movement thereof;
   a second framework mounted sleeve bearing disposed in vertical alignment with said first sleeve bearing, and spaced therefrom, to permit sliding of said second holder means therethrough and to preclude lateral movement thereof; and
   a thrust bearing means affixed to and movable with said second holder means, said thrust bearing means being disposed intermediate said first and second framework mounted sleeve bearings, for (1) transmitting vertical and rotational forces to said second holder and (2) accommodating a predetermined lateral movement thereof.

3. In an apparatus for advancing a workpiece through a vertical float zone refining treating chamber;
   a framework for supporting said treating chamber;
   a first holder means extending into one side of said chamber for gripping one end of a workpiece;
   a second holder means extending through the opposite side of said chamber for gripping the other end of said workpiece;
   means for mounting said first holder means for both vertical movement in said chamber and for lateral movement with respect thereto;
   means mounting said second holder means for vertical movement in said chamber and for lateral movement with respect thereto, said means including:
      a first sleeve bearing mounted in said framework in communication with said treating chamber to permit sliding of said second holder means therethrough and to preclude lateral movement thereof;
      a second framework mounted sleeve bearing disposed in vertical alignment with said first sleeve bearing, and spaced therefrom, to permit sliding of said second holder means therethrough and to preclude lateral movement thereof; and
      a thrust bearing means affixed to and movable with said second holder means, said thrust bearing means being disposed intermediate said first and second framework mounted sleeve bearings, for (1) transmitting vertical and rotational forces to said second holder and (2) accommodating a predetermined lateral movement thereof;
   means for moving said second holder means in said treating chamber to grip a workpiece held by said first holder means;
   means for moving the first and second holder means to advance the gripped workpiece through said chamber; and
   means for imparting a rotative force to said second holder means while said workpiece is advanced through the chamber.

4. In an apparatus for advancing a workpiece through a vertical float zone refining treating chamber;
   a framework for supporting said treating chamber;
   an upper plate and a lower plate respectively spanning said treating chamber and mounted for movement relative to said framework and said treating chamber;
   a first holder means extending from said upper plate into one side of said chamber for gripping one end of a workpiece;
   a second holder means extending through the lower plate into the opposite side of said chamber for gripping the other end of said workpiece;
   means for mounting said first holder means for both vertical movement in said chamber and for lateral movement with respect thereto;
   means mounting said second holder means for vertical movement in said chamber and for lateral movement with respect thereto, said means including:
      a first sleeve bearing mounted in said framework in communication with said treating chamber to permit sliding of said second holder means therethrough and to preclude lateral movement thereof;
      a second framework mounted sleeve bearing disposed in vertical alignment with said first sleeve bearing, and spaced therefrom, to permit sliding of said second holder means therethrough and to preclude lateral movement thereof; and
      a thrust bearing means affixed to and movable with said second holder means, said thrust bearing means being disposed intermediate said first and second framework mounted sleeve bearings, for (1) transmitting vertical and rotational forces to said second holder and (2) accommodating a predetermined lateral movement thereof;
   means for moving said second holder means in said treating chamber to grip a workpiece held by said first holder means;
   means for moving the first and second holder means to advance the gripped workpiece through said chamber; and
   means for imparting a rotative force to said second holder means while said workpiece is advanced through the chamber.

5. In an apparatus for forming a single crystal rod of semiconductive material from a polycrystalline rod by float zone melting and simultaneously doping the single crystal rod so formed;
   a vertical, elongated heating chamber;
   means for supporting a polycrystalline rod vertically in the chamber, said means including an upper and a lower chuck;
   a first shaft connected to the lower chuck;
   a first pair of spaced bearings which laterally constrain said first shaft and through which said shaft is free to slide vertically;
   a first thrust bearing means movably mounted between said first pair of spaced bearings for communicating vertical and rotational movement to said first shaft, said thrust bearing means including a first bearing unit spaced from said first shaft and a second bearing unit connected to said shaft to engage and support said first bearing unit;
   means for rotating said first bearing unit;
   means for transmitting the rotation of said first bearing unit to said shaft while said shaft is free to bow laterally into the space between said shaft and said first bearing unit;
   a second shaft connected to the upper chuck;
   a second pair of spaced bearings which laterally constrain said second shaft and through which said shaft is free to slide vertically;
   a second thrust bearing means movably mounted between said second pair of spaced bearings for communicating vertical movement to said second shaft, said second thrust bearing means including a first bearing unit spaced from said second shaft bearing unit connected to said second shaft to engage said first bearing unit of said second thrust bearing means and to preclude rotation of said second shaft relative to said second thrust bearing means; and
   means for imparting vertical movement to said second thrust bearing means, said second thrust bearing transmitting said movement to said second shaft while said shaft is free to bow laterally into the space between said second shaft and said first bearing unit of said second thrust bearing means.

6. Apparatus as set forth in claim 5, wherein the lower chuck includes:
   a housing rigidly mounted on said first shaft;
   means rotatably mounted in said housing for supporting and gripping a seed crystal; and
   means interposed between said housing and said seed gripping means for transmitting a predetermined maximum torque from said housing to said gripping means to rotate said gripping means in unison with said housing until said predetermined maximum torque is insufficient to overcome the resistance of said seed crystal to rotate at which time said gripping means will remain fixed relative to said seed crystal and will rotate relative to said housing.

7. Apparatus as set forth in claim 5, wherein said upper chuck includes:
- a hollow housing;
- a plate mounted in said housing and having a plurality of resilient fingers depending therefrom for releasably gripping the upper end of a rod of semi-conductive material;
- resilient means interposed between said housing and the top of said plate to adjust the position of said plate relative to said housing in response to axial expansion or shrinkage of said rod;
- at least three spaced, vertically movable screws in engagement with the bottom of said plate for vertically orienting the longitudinal axis of the polycrystalline rod; and
- at least three spaced horizontally movable screws in engagement with the side of the plate for adjusting the horizontal position of said rod.

8. In an apparatus for advancing a rod of semiconductive material through a heating zone, wherein the material is crystallized;
- a stationary support frame including a vertically extending array of guide rods;
- a carriage slidably mounted on said support frame guide rods and comprising rigidly connected upper and lower horizontal plates which span a heating zone, said lower plate of said carriage having a bore therethrough;
- first means positioned in said heating zone for gripping a first end of a rod of semiconductive material;
- heating means positioned in said heating zone for melting a predetermined portion of said rod;
- means mounting said first gripping means on the upper plate of said carriage, said means precluding vertical and rotational movement of said gripping means relative to said upper plate while permitting a predetermined maximum horizontal movement of said gripping means;
- a shaft having a section passing through the bore in said lower plate of said carriage and into said heating zone and a section projecting below said lower plate;
- second means positioned on the section of said shaft in said heating zone for gripping a second end of said rod;
- means for connecting said carriage with said shaft to provide movement of said shaft in unison with said carriage;
- means for moving said carriage to advance said rod through said heating zone;
- means including a slip-clutch for rotating at least one of said gripping means to impart a predetermined maximum torque on said rod; and
- means connected to said shaft for applying a force on said shaft which acts to move said shaft relative to said carriage to vary the longitudinal forces imparted to said rod as it advanced through said heating zone.

9. A apparatus as set forth in claim 8, wherein said means for applying a force on said shaft tending to move said shaft relative to said carriage includes:
- a support frame including a stationary horizontal plate and a vertically extending array of tie rods which rigidly connect said plate to the bottom of said lower plate of said carriage;
- a movable plate slidably mounted on said tie rods, said movable plate having a bore therethrough for receiving said section of said shaft projecting below said lower plate of said carriage;
- a thrust bearing means mounted in said bore in said movable plate for communicating vertical movement of said plate to said shaft, said bearing means including:
  - a sleeve slidably fitted over said shaft, said sleeve and said shaft having a clearance space therebetween to permit lateral movement of said shaft relative to said sleeve to the extent of said clearance;
  - a pair of spaced fixed bearings engaging said sleeve for precluding vertical movement of said shaft relative to said sleeve; and
  - a bearing member interposed between said sleeve and the wall of said bore in said movable plate to permit rotation of said sleeve and said shaft relative to said movable plate; and
- means for driving said movable plate vertically up and down relative to said lower plate of said carriage to correspondingly move said shaft and thereby vary the longitudinal forces imparted to said rod as it advances through said heating zone.

10. In an apparatus for simultaneously forming and doping a single crystal rod of semiconductive material from a polycrystalline rod wherein the polycrystalline rod is advanced through a work chamber;
- a stationary support frame comprising a plurality of spaced, horizontal support plates connected together by a plurality of vertically extending guide rods, said plates having aligned bores therethrough;
- a first carriage comprising spaced upper and lower horizontal carriage plates fixedly connected by a plurality of tie rods, said plates having spaced apertures therethrough to receive said guide rods and bores aligned with the bores in said support plates;
- a work chamber fixedly mounted to said support and positioned between said upper and lower carriage plates;
- a first shaft extending through the bore in said upper carriage plate, through the bore in the support plate positioned above said chamber and into said chamber;
- a first bearing means mounted in said upper carriage plate bore for precluding rotational and vertical movement of said first shaft with respect to said upper carriage plate while permitting a predetermined maximum lateral movement of said shaft;
- means on the lower end of said first shaft for gripping and holding one end of a polycrystalline semiconductive rod;
- means for adjusting the position of said gripping means relative to said first shaft to position the longitudinal axis of the polycrystalline rod in exact alignment with said carriage and said support plate bores;
- a second carriage movably mounted on said first carriage and positioned below said lower plate thereof, said second carriage having a bore therethrough in vertical alignment with said support plate bores and said first carriage plate bores;
- a second shaft extending from inside said chamber through the bores in said lower plate of said first carriage, the support plate positioned below said chamber, and said second carriage;
- a second bearing means mounted in said second carriage bore for precluding vertical movement of said second shaft with respect to said second carriage while permitting rotational movement and a predetermined maximum lateral movement of said second shaft;
- means including a slip clutch on the upper end of said second shaft for gripping and holding a single crystal semiconductive seed;
- a heating means positioned in said chamber for melting a predetermined portion of said polycrystalline rod;
- means for selectively moving said second carriage relative to said first carriage to engage said seed with said melted portion of said polycrystalline rod to join said seed thereto, and to alter the shape of said melted portion;
- means adjacent the melted portion of said polycrystalline rod for impinging a gas containing a doping material onto said melted portion so that, as the melted portion resolidifies, a single crystal rod having said doping material evenly distributed across the section of said single crystal rod is formed;

means for imparting vertical movement to said first carriage to advance said polycrystalline rod past said heating means to progressively melt succeeding portions of said polycrystalline rod; and means for rotating said second shaft and said gripping means thereon relative to said first shaft to rotatably stir said melted portion of said polycrystalline rod.

References Cited

UNITED STATES PATENTS

| | | | |
|---|---|---|---|
| 702,934 | 6/1902 | Errington | 279—23 |
| 2,935,385 | 5/1960 | Cornelison | 23—273 |
| 2,999,737 | 9/1961 | Siebertz | 23—273 |
| 3,036,892 | 5/1962 | Siebertz | 23—273 |
| 3,043,614 | 7/1962 | Eichmann | 279—46 |
| 3,160,478 | 12/1964 | Rummel | 23—273 |
| 3,191,924 | 6/1965 | Haus | 23—273 |
| 3,211,881 | 10/1965 | Jablonski | 23—273 |
| 3,226,203 | 12/1965 | Rummel | 23—273 |
| 3,259,468 | 7/1966 | Stevens | 23—273 |
| 3,275,417 | 9/1966 | Hunt | 23—273 |
| 3,337,303 | 8/1967 | Lorenzini | 23—273 |

NORMAN YUDKOFF, Primary Examiner

R. T. FOSTER, Assistant Examiner

U.S. Cl. X.R.

269—187